(12) United States Patent
Patel et al.

(10) Patent No.: US 8,557,037 B2
(45) Date of Patent: Oct. 15, 2013

(54) ULTRAFINE HYDROUS KAOLIN PIGMENTS, METHODS OF MAKING THE PIGMENTS, AND METHODS OF USING THE PIGMENTS IN GLOSS PAINT FORMULATIONS

(75) Inventors: Navin Patel, Bridgewater, NJ (US);
Sharad Mathur, Macon, GA (US);
Ashok Khokhani, Manalapan, NJ (US);
Kenneth W Folmar, Macon, GA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/926,752

(22) Filed: Aug. 26, 2004

(65) Prior Publication Data
US 2006/0047047 A1 Mar. 2, 2006

(51) Int. Cl.
*C09C 1/42* (2006.01)
(52) U.S. Cl.
USPC .......................................... 106/486; 106/402
(58) Field of Classification Search
USPC ................ 106/486, 402; 502/64, 79; 524/447
See application file for complete search history.

(56) References Cited

U.S. PATENT DOCUMENTS

| | | | |
|---|---|---|---|
| 3,655,038 A * | 4/1972 | Mercade | 209/5 |
| 4,177,174 A * | 12/1979 | Hayashi et al. | 528/103 |
| 4,419,228 A | 12/1983 | Cook et al. | |
| 4,619,705 A * | 10/1986 | Dixon et al. | 106/487 |
| 4,948,362 A | 8/1990 | Baird | |
| 5,227,349 A | 7/1993 | Matthews et al. | 501/145 |
| 5,322,924 A | 6/1994 | Chuang et al. | |
| 5,522,924 A | 6/1996 | Smith et al. | 106/488 |
| 5,584,394 A | 12/1996 | Behl et al. | |
| 5,593,490 A | 1/1997 | Etheridge, Jr. et al. | 106/484 |
| 5,603,411 A | 2/1997 | Williams et al. | |
| 5,624,488 A | 4/1997 | Forbus et al. | 106/484 |
| 5,688,315 A | 11/1997 | Behl et al. | |
| 5,753,029 A | 5/1998 | Gantt et al. | |
| 5,882,396 A * | 3/1999 | Hiorns | 106/464 |
| 5,968,250 A * | 10/1999 | Sheppard et al. | 106/486 |
| 6,136,086 A | 10/2000 | Hen et al. | |
| 6,197,105 B1 * | 3/2001 | Freeman et al. | 106/487 |

(Continued)

FOREIGN PATENT DOCUMENTS

| | | |
|---|---|---|
| AU | 2005272018 | 2/2006 |
| WO | WO 00/66509 | 11/2000 |

(Continued)

OTHER PUBLICATIONS

"Purification of Kaolin," Excerpted and Translation by Shulin Li, Brick & Tile World, No. 19, 1985, 2 pages.

(Continued)

*Primary Examiner* — Pegah Parvini
(74) *Attorney, Agent, or Firm* — Laure Di Lorenzo (57) ABSTRACT

Disclosed are methods of processing kaolin to produce ultrafine hydrous kaolin. The methods involve processing gray crude kaolin by subjecting the kaolin crude to flotation and then centrifuging the kaolin to provide a fine stream that is subject to refinement. Also disclosed are systems for the automated processing of gray crude kaolin to produce the ultrafine hydrous kaolin and paint compositions that contain the ultrafine hydrous kaolin.

24 Claims, 2 Drawing Sheets

(56) References Cited

U.S. PATENT DOCUMENTS

| | | | |
|---|---|---|---|
| 6,242,531 B1 | 6/2001 | Craun et al. | |
| 6,346,145 B1 | 2/2002 | Hen et al. | |
| 6,378,703 B1 | 4/2002 | Mathur et al. | |
| 6,468,343 B1 | 10/2002 | Pruett et al. | 106/486 |
| 6,537,363 B1 | 3/2003 | Golley et al. | |
| 6,585,822 B2 * | 7/2003 | Berube et al. | 428/32.34 |
| 6,646,085 B1 | 11/2003 | Craun et al. | |
| 6,652,642 B2 | 11/2003 | Sare et al. | |
| 6,818,050 B1 * | 11/2004 | Nyssen | 106/401 |
| 7,494,541 B2 | 2/2009 | Mathur et al. | |
| 2002/0117085 A1 * | 8/2002 | Wesley | 106/486 |
| 2003/0085012 A1 * | 5/2003 | Jones et al. | 162/181.8 |
| 2003/0164117 A1 * | 9/2003 | Golley et al. | 106/486 |
| 2004/0255820 A1 * | 12/2004 | Chen et al. | 106/31.13 |

FOREIGN PATENT DOCUMENTS

| | | |
|---|---|---|
| WO | WO 03/022933 A2 * | 3/2003 |
| WO | WO 2006/017030 A1 | 2/2006 |
| WO | 2006/026066 | 3/2006 |

OTHER PUBLICATIONS

Schroeder, Paul A., Kaolin, Sci. & Med., The New Georgia Encyclopedia (available at www.georgiaencyclopedia.org/nge/Article.jsp?id=h-1178), Dec. 12, 2003 (accessed on Jun. 3, 2013).

U.S. Office Action issued by Pegah Parvini, dated May 7, 2009, issued in connection with divisional U.S. Appl. No. 12/237,736.

International Search Report, mailed May 9, 2006, in International Application No. PCT/US2005/027845.

Written Opinion, mailed Feb. 26, 2007, in International Application No. PCT/US2005/027845.

International Preliminary Report on Patentability, mailed Feb. 28, 2007, in International Application No. PCT/US2005/027845.

"Pigments for the Paint and Coatings Industry"—J. M. Huber Corporation, 1989.

"Polygloss ™ 90 Specialty Kaolin"—J.M. Huber Corporation, Sep. 1997.

"Polygloss ™ 90 for the Paint and Coatings Industry"—J.M. Huber Corporation, 1990.

"Polygloss ™ 90 Specialty Kaolin"—J. M. Huber Corporation, Sep. 1995.

* cited by examiner

ULTRAFINE HYDROUS KAOLIN PIGMENTS, METHODS OF MAKING THE PIGMENTS, AND METHODS OF USING THE PIGMENTS IN GLOSS PAINT FORMULATIONS

FIELD OF THE INVENTION

The present invention generally relates to ultrafine kaolin pigments, making ultrafine kaolin pigments from the gray crude kaolin, and using the ultrafine kaolin pigments in paint compositions.

BACKGROUND OF THE INVENTION

Kaolin is a fine usually white clay formed by the weathering of aluminous minerals (as feldspar) and mainly consists of kaolinite. Kaolinite is commonly represented by one or more of the chemical formulae $Al_4Si_4O_{10}(OH)_8$; $Al_2O_3 \cdot 2SiO_2 \cdot 2H_2O$; and/or $Al_2Si_2O_5(OH)_4$. Kaolin is one of the many industrial minerals mined today. Reserves are found in Georgia (USA), Egypt, Brazil, United Kingdom, Queensland (Australia), Korea, China, and Ukraine.

Generally speaking, kaolin from different countries, and even different deposits within the same country, differs in many respects due to variations in a number of kaolinite properties. Examples of such properties include degree of crystallinity, coarseness, brightness, levels of other compounds such as titania and iron oxide, particle size, particle shape, size and/or shape distribution. Variations in properties leads to differences in performance of the resultant kaolin products. For example, crystallinity impacts resultant brightness, whiteness, opacity, gloss, and viscosity of the resultant products. It is noted that opacity and gloss are application performance parameters while the other listed parameters are pigment attribute parameters. Particle size, shape, and distribution impacts the smoothness, optical properties, and flow properties of the resultant products. Smoothness and optical properties are application performance parameters while flow properties are pigment attribute parameters.

Kaolin based products are used in many applications including paints, paper coatings, agricultural compositions, fiberglass products, polymer and rubber compositions, ceramic applications, catalyst supports, pharmaceuticals, cosmetics, electrical components, adhesives, filter aids, and many more. Certain grades of kaolin having discrete properties are ideally suited for select applications. Accordingly, to maximize the quality of a resultant kaolin grade, kaolin crude is subjected to processing that yields a specifically desired grade of kaolin.

The paint industry supplies consumer-oriented products of the solvent and emulsion types. Solvent or so-called "oil based" paints are relatively simple systems, easy to formulate but difficult for the consumer to use. Solvent paint contains a binder (oil of resin), a solvent (thinner), drying agents and pigments. Alkyd paint is the most common kind of oil based paint, and many oil based paints are therefore normally referred to as alkyd paints. Alkyd is simply the name of the synthetic resin, usually containing a vegetable oil, that is used as the binder. Emulsion or so-called "latex" paints are complex mixtures containing latex surfactants, protective colloids, emulsifiers and water in addition to one or more types of pigment. Following their introduction after World War II, latex paints have substantially gained in market acceptance. Latex paints now account for a majority of interior and exterior paint trade sales.

Interior and exterior paints have generally similar formulations. An important distinction, however, is that exterior grade paints contain relatively more binder and prime pigment but less extender pigment than interior paints. This is because paint film integrity and overall durability are more critical in exterior paints than in interior grades. Accordingly, improved pigments and extender pigments are desired for exterior paints.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides ultrafine kaolin pigments that have at least one of high surface area, fine particle size distribution, low oil absorption, and high GE brightness values. Waste is mitigated when making the ultrafine kaolin pigments, because selective flocculation is not performed on the crude kaolin starting material. Moreover, unused coarse pigments produced as a by-product while making the ultrafine kaolin pigments may be advantageously used in paper coating applications. Due to the high surface area, fine particle size distribution, low oil absorption, and high GE brightness values of the ultrafine kaolin pigments, they are ideally suited for paint formulations, especially gloss paint compositions.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The methods of the present invention enable the efficient production of ultrafine hydrous kaolin from gray kaolin crude. The ultrafine hydrous kaolin is advantageously employed in paint compositions. The methods of the present invention also enable the production of coarse engineered kaolin for paper applications as a by product of making the ultrafine kaolin. Ultrafine kaolin pigments are characterized by low oil absorption, high brightness, high surface area, at least 96% by weight of the particles have a size of about 1 micron or less, and at least 97% by weight of the particles have a size of about 2 microns or less. Coarse engineered kaolin pigments are characterized by low surface area, at least 80% by weight of the particles have a size of about 2 microns or less, and narrow particle size distribution.

The methods of the present invention involve subjecting gray kaolin crude to floatation and then high speed centrifugation in a sequential manner to provide the ultrafine kaolin. Degritting may be optionally performed before flotation while ozonation may be optionally performed after flotation and before high speed centrifugation. In one embodiment, the gray kaolin crude or the degritted gray kaolin crude is not subjected to selective flocculation. Sequential means that flotation and centrifugation are performed in the order listed, although optionally other acts may be performed before, during and/or after the two sequential acts (such as degritting and/or ozonation and/or refinement).

The kaolin crude that can be subjected to the methods of the present invention contains a super-major amount of gray or hard kaolin, optionally a minor amount of fine white kaolin, and optionally small amounts of nonkaolin particles. Generally, gray kaolins have a high iron content. Nonkaolin particles include titania, quartz, various ferruginous minerals, mica, and nonkaolinitic clays such as bentonite and attapulgite. Super-major amounts include at least 75% by weight, minor amounts include less than 50% by weight, and small amounts include less than 10% by weight. In another embodiment, the kaolin crude contains at least about 80% by weight of gray or hard kaolin and less than about 20% by weight of fine white kaolin. In yet another embodiment, the kaolin crude contains at least about 90% by weight of gray or hard kaolin and less than about 10% by weight of fine white kaolin.

The kaolin crude contains particles wherein at least about 70% by weight have a particle size of about 2 microns or less, at least about 30% by weight have a particle size of about 0.3 microns or less, a titania content from about 1% to about 3% by weight, and a surface area of at least about 18 m$^2$/g. In another embodiment, the kaolin crude contains particles wherein at least about 80% by weight have a particle size of about 2 microns or less, at least about 35% by weight have a particle size of about 0.3 microns or less, a titania content from about 1.5% to about 2.5% by weight, and a surface area of at least about 20 m$^2$/g.

Prior to processing the kaolin crude, a slurry may be formed by combining the kaolin crude with water, and optionally a dispersant. One advantage to the present invention is that a dispersant may not be required before an ultrafine stream of hydrous kaolin is separated from coarse kaolin via high-speed contrifugation. Thus, in one embodiment, a dispersant is not employed until an ultrafine stream of hydrous kaolin is separated from coarse kaolin via high-speed contrifugation.

The dispersant may be an organic dispersant or inorganic dispersant. Inorganic dispersant typically include phosphate salts. Examples of phosphate salts include inorganic polyphosphates and pyrophosphates (which are actually a type of polyphosphate), such as sodium hexametaphosphate (SHMP), sodium tripolyphosphate (STPP) and tetrasodium pyrophosphate (TSPP).

Organic dispersants typically include ammonia-based dispersants, sulfonate dispersants, carboxylic acid dispersants, and polymeric dispersants, such as polyacrylate dispersants, as well as other organic dispersants conventionally employed in kaolin pigment processing.

The kaolin crude is optionally subjected to degritting. Kaolin crude occurs as an ore that may contain grit, grit composed a relatively large particles. The grit is undesirable and thus is removed. The resulting degritted crude kaolin is composed largely of kaolin particles that usually have a wide range of sizes ranging from slimes (finer than 0.3 microns) up to about 15 microns.

Degritting is performed in any conventional manner using one or more of sieves, sandboxes, gravity settling, or hydrocyclones. Either wet or dry degritting may be employed. For example, degritting may be performed by combining the crude kaolin with water and passing the slurried mixture through a sieve, such as a 325 mesh sieve or a 200 mesh sieve. Optionally, a clay dispersant is also added to the slurry to provide additional fluidity to facilitate the degritting process. Examples of clay dispersants include ammonia-based dispersants, phosphate-based dispersants, sulfonate dispersants, carboxylic acid dispersants, and polymeric dispersants, such as polyacrylate dispersants, as well as other organic dispersants employed in kaolin pigment processing. The amount of dispersant used in the slurry is typically from about 0.01% to about 1% based on the weight of crude kaolin.

After degritting the crude kaolin, the resulting degritted crude kaolin is subjected to flotation. Flotation serves to reduce the titania content to less than about 1% by weight and/or reduce the iron oxide content to less than about 1.5% by weight. In another embodiment, flotation reduces the titania content to less than about 0.7% by weight and/or reduce the iron oxide content to less than about 1.25% by weight. In yet another embodiment, flotation reduces the titania content to less than about 0.5% by weight and/or reduce the iron oxide content to less than about 1% by weight. In still yet another embodiment, flotation reduces the titania content to less than about 0.4% by weight and/or reduce the iron oxide content to less than about 0.75% by weight. The degritted crude may be centrifuged prior to flotation to control the particle size distribution such that the subsequent high speed centrifuge operation results in desired coarse particle size distribution that does not require a further centrifuge act.

Flotation is performed in any conventional manner including wet flotation, ultraflotation, froth flotation, TREP flotation (titania removal and extraction process), and the like. General methods of flotation are described in Mathur, S., "Kaolin Flotation", Journal of Colloid and Interface Science, 256, pp. 153-158, 2002, which is hereby incorporated by reference in this regard. Ultraflotation involves using a particulate reagent with a fatty acid and selected flotation oils to remove titania from a slurry of impure clay. One characteristic of ultraflotation is that the purified kaolin is recovered as a dilute slurry that is subsequently dewatered. Froth flotation functions by separating certain mineral particles from other particles in a slurry based on differences in the mineral species. The processing generally depends upon adding reagents that selectively attach to mineral particles to be floated, whereby the particles with attached reagent(s) have a greater affinity for air bubbles than other particles and can be removed as a froth. TREP flotation involves conditioning kaolin in a high intensity mill using a collector, such as a fatty acid collector, tall oil collector, or an hydroxamate collector, and a metal salt. This is followed by the addition of a dispersant, such as an acrylate salt dispersant. Optionally, magnetic separation or selective flocculation can also be used for improving brightness stand alone or in conjunction with flotation.

Flotation may be performed at any suitable solids content, pH, and temperature using a slurry of the degritted kaolin crude and water. In one embodiment, during flotation at least one of the following parameters are satisfied: the solids content is from about 10% to about 50%, the pH is from about 5 to about 11, and the temperature is from about 10° C. to about 90° C. In another embodiment, during flotation at least one of the following parameters are satisfied: the solids content is from about 20% to about 40%, the pH is from about 6 to about 10, and the temperature is from about 20° C. to about 60° C.

In the methods of the present invention, selective flocculation of kaolin crude is not required to provide the kaolin crude with a discrete particle size/particle size distribution. In selective flocculation, charged inorganic or organic molecules are used to selectively flocculate minerals from each other based on difference in mineral species. Selective flocculation of kaolin crude in some instances may deleteriously affect the brightness and/or viscosity of the resultant kaolin pigment. In one embodiment, the methods of the present invention do not comprise selective flocculation of the kaolin crude. In another embodiment, the methods of the present invention do not comprise selective flocculation of kaolin until after high-speed centrifugation (discussed below). In yet another embodiment, the methods of the present invention do not comprise delaminating kaolin crude.

After flotation, the kaolin undergoing processing is optionally subjected to ozonation. Ozonation involves oxidative bleaching, using ozone, in order to bleach components, such as organic discolorants, that may be present. The ozone acts not only to destroy substantial portions of discoloring organics, but also destroys by oxidation the organic dispersant, if such a compound is present. However, the ozone does not destroy inorganic dispersants.

Ozonation is performed in any suitable manner. For example, ozonation may be performed at a dosage level from about 0.1 to about 20 pounds of ozone per ton of kaolin. In another embodiment, ozonation is performed at a dosage level from about 0.5 to about 10 pounds of ozone per ton of kaolin. The ozone may be applied as a stream of bubbles which can be passed upwardly through the slurry. This can be a batch process or a continuous process in which the ozone bubbles pass counter current to a flow of the slurry in a pipe or other conduit, such as mixed and packed column.

After ozonation, the ozonated kaolin is subjected to optional delamination. Delamination can involve wet milling, slurry milling, wet grinding, and the like. Such delamination processes involve the use of a grinding media and water. Kaolin is combined with the grinding media and water to form a slurry and transported, such as by pumping, through the delamination equipment. Typically, the kaolin solids in the slurry during delamination is from about 5% to about 50% by weight.

After ozonation, high-speed centrifugation is employed to separate the optionally ozonated kaolin into two streams. It is noted that the high-speed centrifugation is performed after flotation. Centrifugation separates the kaolin into a coarse stream (at least about 70% by weight of the particles have a size of 2 microns or less) and a fine stream (at least about 80% by weight of the particles have a size of 1 micron or less). In another embodiment, the coarse stream has at least about 80% by weight of the particles have a size of 2 microns or less and the fine stream has at least about 85% by weight of the particles have a size of 1 micron or less. In yet another embodiment, the coarse stream has at least about 90% by weight of the particles have a size of 2 microns or less and the fine stream has at least about 90% by weight of the particles have a size of 1 micron or less.

Although not wishing to be bound by any theory, it is believed that usage of high-speed centrifuge to generate the ultrafine particle size distribution also results in removal of coloring impurities and thus increasing brightness of the product in excess of about 91 GEB.

All particle sizes referred to herein are determined by a conventional sedimentation technique using a Micromeretics, Inc.'s SEDIGRAPH® 5100 analyzer analysis. The sizes, in microns, are reported as "e.s.d." (equivalent spherical diameter). Particles are slurried in water with a dispersant and pumped through the detector with agitation to disperse loose agglomerates.

Centrifugation may be conducted more than once, but at least one centrifugation treatment is a high-speed centrifugation treatment. In a high-speed centrifugation treatment the centrifuge may operate at "g" forces from above about 1,000 to about 10,000. In another embodiment, the high-speed centrifugation treatment the centrifuge may operate at "g" forces from about 2,000 to about 7,500. In yet another embodiment, the high-speed centrifugation treatment the centrifuge may operate at "g" forces from above about 2,500 to about 5,000. Examples of centrifuges include Bird solid bowl machines, high speed centrifuges, horizontal three-phase centrifuges, and the like.

The fine stream is then subject to refining, which may involve at least one of flocculation, bleaching, filtering, drying, blending, and pulverizing to provide the ultrafine kaolin. Flocculation involves separating minerals of one species from minerals of the same species, e.g., the separation of ultrafine kaolin particles from fine or coarse kaolin particles. Flocculation is effected using an ionic material, such as an acid. Sulfuric acid is an inexpensive and widely available acid.

Generally, bleaching involves increasing the brightness of the kaolin. Bleaching involves contacting the coarse kaolin stream with a suitable amount of one or more of hydrosulfite (dithionite) salts, potassium permanganate, oxygen gas, alkali bichromates, alkali chlorates, alkali chlorites, ammonium persulfate and soluble peroxides such as sodium and hydrogen peroxide, sodium hypochlorite, and the like.

Filtration can be employed to at least one of increase solids content (for example increase solids content to about 55% or higher) and to substantially remove particles larger than 2 microns. Increasing the solids content in some instances improves the efficiency of a subsequent spray drying operation. Filtration can be carried out in any suitable manner and is typically carried out using rotary drum vacuum filters.

Drying, such as spray drying, the kaolin is performed to reduce the moisture level of the kaolin. Drying the kaolin may facilitate optional, subsequent pulverization acts. The kaolin is dried by any suitable technique. Examples of drying kaolin include spray drying, flash drying, rotary drying, or other conglomeration techniques. These drying techniques are known in the clay industry. In one embodiment, after drying the ultrafine kaolin has a moisture level of less than about 1.5% by weight. In another embodiment, after drying the ultrafine kaolin has a moisture level of less than about 1% by weight. In yet another embodiment, after drying the ultrafine kaolin has a moisture level of less than about 0.5% by weight.

Blending involves combining the kaolin with other particulate matter, such as a different batch of kaolin, titania, other clays, calcium carbonate, calcined kaolin, and the like to arrive at a mixture that has properties desired by the end user or a subsequent user.

Pulverization may be conducted in any suitable manner. In one embodiment, the ultrafine kaolin is pulverized in at least once. In another embodiment, the ultrafine kaolin is pulverized in at least two separate acts (twice pulverized). The pulverization may break up any agglomerates that may be present. Such agglomerates may form during drying, changing the particle size achieved by high-speed centrifugation and other process acts.

The ultrafine kaolin pigment product has numerous desirable properties. For example, the ultrafine kaolin pigment product has one or more of at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of at least about 23 m$^2$/g, about 0.75% by weight or less of titania, about 1.5% by weight or less of iron oxide, and brightness of about 91 or more. In another embodiment, the ultrafine kaolin pigment product has one or more of at least about 98% by weight of the particles have a size of 2 microns or less, at least about 97% by weight of the particles have a size of 1 micron or less, at least about 90% by weight of the particles have a size of 0.5 microns or less, at least about 70% of the particles have a size of 0.3 microns or less, a surface area of at least about 25 m$^2$/g, about 0.5% by weight or less of titania, about 1.25% by weight or less of iron oxide, and brightness greater than 92. In yet another embodiment, the ultrafine kaolin pigment product has one or more of at least about 99% by weight of the particles have a size of 2 microns or less, at least about 98% by weight of the particles have a size of 1 micron or less, at least about 92% by weight of the particles have a size of 0.5 microns or less, at least about 72% of the particles have a size of 0.3 microns or less, a surface area of at least about 26 m$^2$/g, about 0.4% by weight or less of titania, about 1% by weight or less of iron oxide, and brightness of about 93 or more.

Surface area is determined by the art recognized BET method using N$_2$ as the adsorbate. Surface area alternatively is determined using Gardner Coleman Oil Absorption Test is based on ASTM D-1483-84 which measures grams of oil absorbed per 100 grams of kaolin. Brightness measurements are performed using the TAPPI standard method, T524, and are reported as "GE brightness" or "GEB values".

The coarse stream is then subject to refining which may involve at least one of bleaching, filtering, bulking, spray drying, and blending. Blending involves combining the coarse kaolin with other particulate matter, such as a different batch of kaolin, titania, other clays, calcium carbonate, calcined kaolin, and the like to arrive at a mixture that has properties desired by the end user or a subsequent user.

The coarse kaolin pigment product has numerous desirable properties that make it particularly useful in paper coating applications. For example, the coarse kaolin pigment product has one or more of at least about 95% by weight of the particles have a size of 5 microns or less, at least about 80% by weight of the particles have a size of 2 microns or less, at least about 20% by weight of the particles have a size of 0.3 microns or less, a surface area from about 14 to about 20 m$^2$/g, about 1% by weight or less of titania, about 1.5% by weight or less of iron oxide, and a brightness of about 85 or more. In another embodiment, the coarse kaolin pigment product has one or more of at least about 96% by weight of the particles have a size of 5 microns or less, at least about 90% by weight of the particles have a size of 2 microns or less, at least about 25% by weight of the particles have a size of 0.3 microns or less, a surface area from about 15 to about 19 m$^2$/g, about 0.75% by weight or less of titania, about 1.25% by weight or less of iron oxide, and a brightness of about 87.5 or more.

Generally speaking, one or more conventional clay processing steps such as crushing, grinding, fractionation, delamination, magnetic separation, floc/filtration, heat treatment, and the like, may be employed before or after the methods of the present invention.

Crushing reduces kaolin rock to gravel; that is, kaolin rock having diameters of less than about 10 cm in diameter. Grinding involves processing crude kaolin to achieve a desired particle size distribution. Grinding may be carried out by dry milling, dry ball milling, dry grinding, and the like.

Kaolin contains naturally separated platy kaolin particles as well as "booklets", which comprise stacks of kaolin platelets. These stacks are concentrated in particles having a size of about 2 or more microns. Delamination of these booklets involves providing impact energy which is just sufficient to cleave apart the kaolin platelets that make up the booklets without further fracturing the kaolin platelets. Delamination can involve wet milling, slurry milling, wet grinding, and the like. Such optional delamination processes involve the use of a grinding media and water. Kaolin is combined with the grinding media and water to form a slurry and transported, such as by pumping, through the delamination equipment. Typically, the kaolin solids in the slurry during delamination is from about 5% to about 50% by weight.

Kaolin may be optionally subjected to one or more heat treatments. When kaolin is heated, it undergoes a series of characteristic changes, detectable by various methods including differential thermal analysis (DTA). Heat treatment may be employed to form one or more of metakaolin, partially calcined kaolin, and calcined kaolin, depending on the temperature/duration of the heat treatment. Heat treatment is performed under one of an inert atmosphere, an oxidizing atmosphere, and a reducing atmosphere.

For example, after heating from about 450 to about 650° C. for a sufficient period of time, kaolin undergoes a strongly endothermic dehydration reaction resulting in the conversion to material known as metakaolin. The metakaolin state is conveniently ascertained by acid solubility testing because the alumina in the clay is virtually completely soluble in strong mineral acid.

Calcining destroys the crystallinity of hydrous kaolin and renders the kaolin substantially amorphous. Calcination occurs after heating at temperatures in the range from about 700 to about 1200° C. for a sufficient period of time. Commercial vertical and horizontal rotary calciners can be used to produce metakaolin, partially calcined kaolin, and/or calcined kaolin. Operation is controlled to avoid calcining at sufficiently high temperatures to form unwanted mullite ($3Al_2O_3.SiO_2$).

Figure 1:
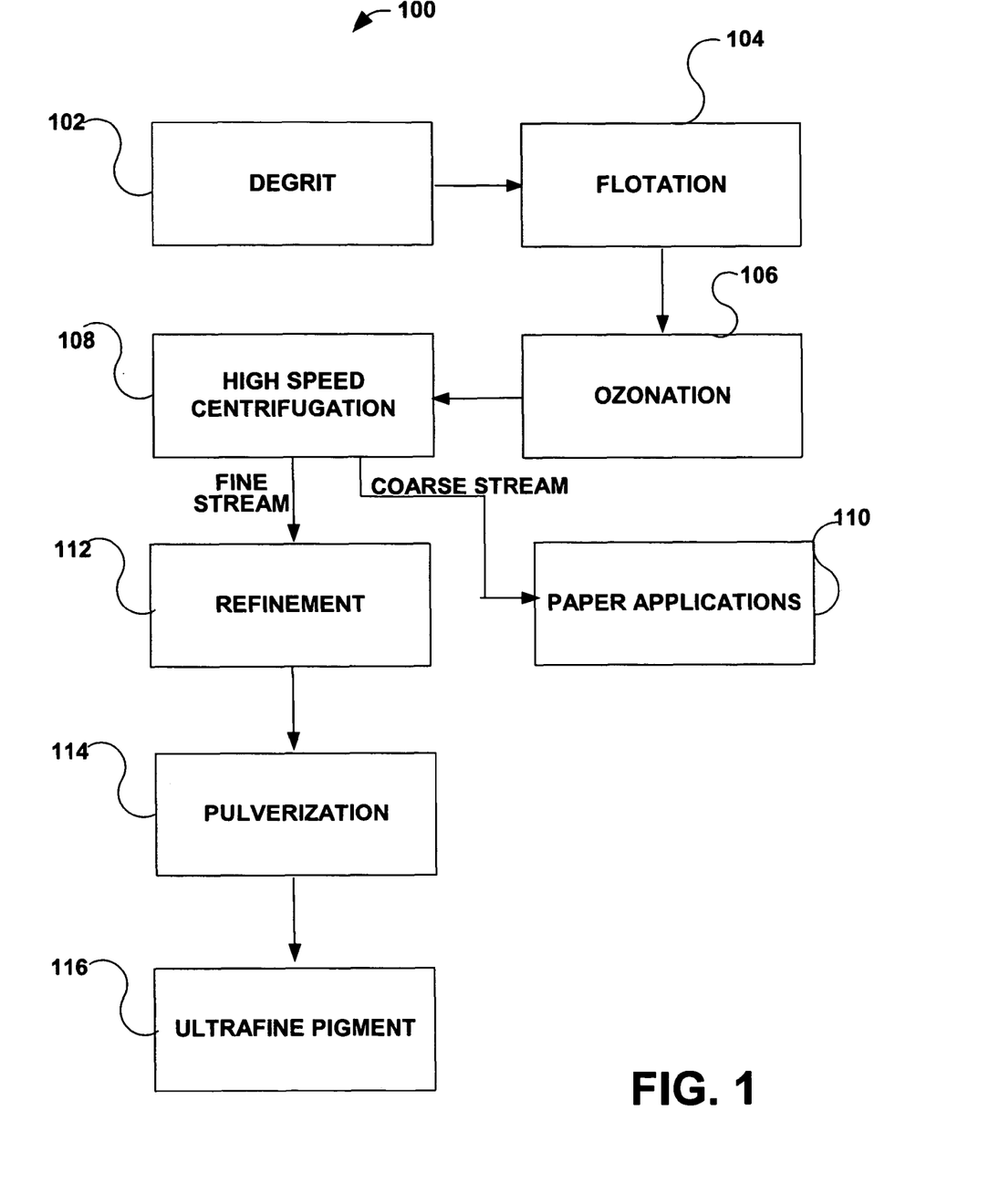
FIG. 1 is a flow diagram of one aspect of a system and method of processing kaolin in accordance with the present invention.

Referring to FIG. 1, a high level diagram of various aspects of an ultrafine kaolin processing methodology 100 is shown. In act 102, kaolin crude containing at least a super majority of gray kaolin is optionally degritted, removing relatively large particles from the gray kaolin crude. After relatively large particles are removed from the gray kaolin crude, act 104 involves flotation to reduce the amount of at least one of titania and/or iron oxide in the degritted kaolin. Act 106 involves optionally ozonating the kaolin. After ozonation, act 108 involves centrifuging at high speeds the kaolin and thereby separating the kaolin into two different grades/streams. The coarse stream produced by act 108 is subjected to additional processing such as refining and then employed in paper applications 110. In act 112, the fine stream from act 108 is subject to refinement, such as flocculation, bleaching, filtration, and spray drying, to produce an ultrafine kaolin stream. The ultrafine kaolin is optionally subject to pulverization 116 to provide the ultrafine kaolin pigments 116.

Figure 2:
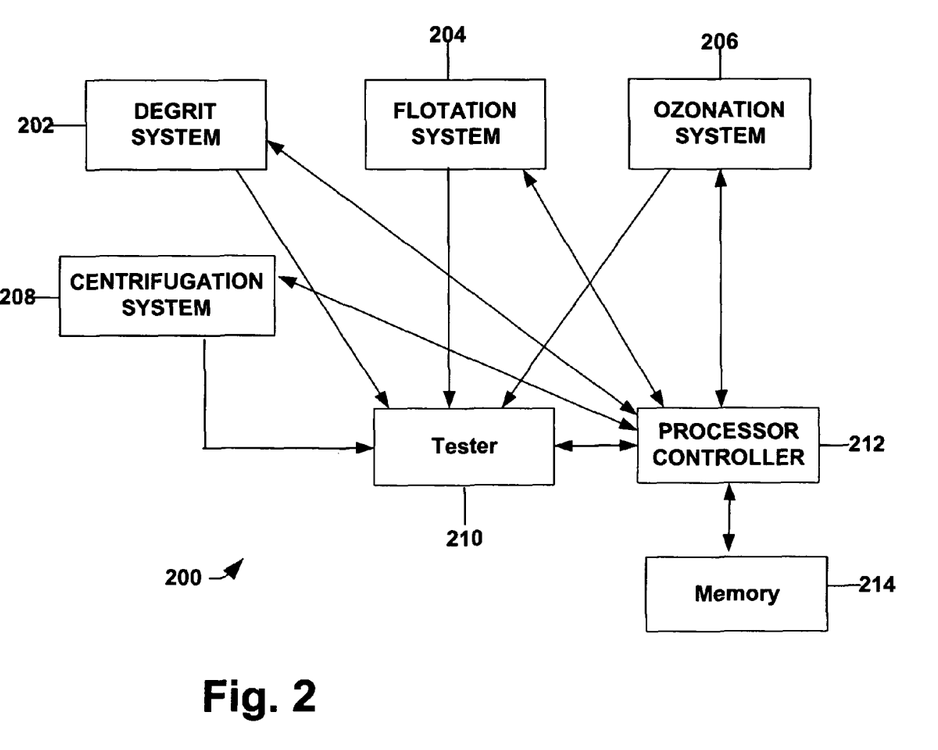
FIG. 2 is a schematic diagram of another aspect of a system for automated processing of kaolin in accordance with the present invention.

Referring to FIG. 2, a system 200 to process gray kaolin crude into ultrafine kaolin is shown. The system 200 includes one or more of a degrit system 202 for degritting crude kaolin, a flotation system 204, an ozonation system 206, and a high-speed cetrifugation system 208, at least one of which is coupled to a tester 210 and a processor-controller 212. The degrit system 202 processes gray crude kaolin by removing large grit from the kaolin crude, the flotation system 204 reduces the titania and or iron oxide content of the degritted kaolin, the ozonation system 206 oxidizes species within the kaolin process stream, and the high-speed cetrifugation system 208 separates two distinct kaolin streams from each other (fine and coarse). The tester 210 can be any device that measures at least one parameter associated with the kaolin being processed (such as particle size distribution, surface area, brightness, whiteness, roughness, % moisture content, % content of particular chemical such as titania, and the like) or any parameter associated with any one of the degrit system 202, flotation system 204, ozonation system 206, and high-speed cetrifugation system 208 (such as the particle size and/or "g" force with the high-speed cetrifugation system 208).

While any one of the degrit system 202, flotation system 204, ozonation system 206, and high-speed cetrifugation system 208 are operating, the tester 210 tests the kaolin being processed. For example, while the degrit system 202, flotation system 204, or ozonation system 206 is operating, a sample of kaolin may be withdrawn and tested to determine a parameter, such as particle size distribution. The tester 210 sends the data generated by the testing to the processor-controller 212, which is adapted to receive such kaolin parameter data from the tester 210. Alternatively, the tester 210 may measure a parameter of the degrit system 202, flotation system 204, ozonation system 206, and cetrifugation system 208, and send data associated with the parameter to the processor-controller.

The processor-controller 212 analyzes such data, and based on the analysis, sends a signal to any of the degrit system 202, flotation system 204, ozonation system 206, and cetrifugation system 208 to either continue the process, modify the process, or terminate the process. To facilitate such analysis, a data store or memory 214 may be coupled to the processor-controller 212 so that the processor-controller 212 can compare data sent by the tester 210 to stored data. The processor-controller 212 may send a signal to the tester 210 to perform a test. Examples of ways in which the processor-controller 212 can modify a process include increasing or decreasing the "g" forces in the high-speed cetrifugation system 208; increasing or decreasing the temperature in the flotation system 204; increasing or decreasing the work/energy required by any of the degrit system 202, flotation system 204, ozonation system 206, and/or cetrifugation system 208; continue operating or terminate any of the degrit system 202, flotation system 204, or ozonation system 206 to achieve a certain desired particle size distribution; and the like. Consequently, the system 200 can provide real time analysis and real time feed back, so that the processing of kaolin can be modified in real time to suit immediately existing needs.

The present invention further relates to paint compositions containing major amounts of a paint vehicle and minor amounts of the ultrafine hydrous kaolin described herein. Major amounts include at least 50% (percent volume of dry paint film) whereas minor amounts include less than 50% (percent volume of dry paint film). The paint vehicle may be any one of a latex paint vehicle, oil based paint vehicle, alkyd paint vehicle, acrylic paint vehicle, styrene paint vehicle, and/or epoxy paint vehicle. The paint vehicle contains components suitable for forming a paint film. Most often, the ultrafine hydrous kaolin described herein functions as a pigment extender or pigment.

Paint compositions may be made in any suitable manner. For example, the components may be combined and mixed. The components may be combined all at once, or sequentially.

In one embodiment, the paint compositions of the present invention contain from 50% to about 99.99% (percent volume of dry paint film) of a paint vehicle and from about 0.01% to about 49% (percent volume of dry paint film) of the ultrafine hydrous kaolin. In another embodiment, the paint compositions of the present invention contain from about 60% to about 99.9% (percent volume of dry paint film) of a paint vehicle and from about 0.1% to about 40% (percent volume of dry paint film) of the ultrafine hydrous kaolin. In yet another embodiment, the paint compositions of the present invention contain from about 70% to about 99% (percent volume of dry paint film) of a paint vehicle and from about 1% to about 30% (percent volume of dry paint film) of the ultrafine hydrous kaolin.

In one embodiment, the ultrafine hydrous kaolin described herein may be used as a pigment extender with titania as a pigment in a paint composition. In another embodiment, the paint compositions of the present invention contain from 50% to about 99.9% (percent volume of dry paint film) of a paint vehicle, from about 0.1% to about 40% (percent volume of dry paint film) of titania, and from about 0.1% to about 40% (percent volume of dry paint film) of the ultrafine hydrous kaolin. In yet another embodiment, the paint compositions of the present invention contain from about 60% to about 98% (percent volume of dry paint film) of a paint vehicle, from about 1% to about 30% (percent volume of dry paint film) of titania, and from about 1% to about 30% (percent volume of dry paint film) of the ultrafine hydrous kaolin. In still yet another embodiment, the ultrafine hydrous kaolin described herein may be used as a pigment extender with other pigment extenders such as one or more of clays, carbonates, talc, and silicas with or without titania as a pigment in a paint composition.

One parameter in paint formulation is the pigment volume concentration (hereinafter PVC). PVC is a control factor in the design of paint formulations, because paint properties are generally governed by volume rather than weight effects. The following equation defines the PVC as a percentage of volume of dried paint film:

$$\% PVC = 100 \times V_{pigment}/V_{total}$$

where $V_{pigment}$ is the volume of the pigment and other non-volatiles in the dried paint film and $V_{total}$ is the $V_{pigment}$ plus the volume of the paint vehicle/resin. The critical pigment volume concentration (hereinafter CPVC) is defined as that PVC at which air interfaces are generated in the dry paint film due to the deficiency of binder with respect to pigment. It is well known that many paint volume properties change drastically at CPVC. Typically, the relationship between PVC and CPVC is nonlinear. In many instances, different paints are properly compared on the basis of equal reduced pigment volume concentration (hereinafter RPVC). The RPVC is defined by the following equation:

$$RPVC = PVC/CPVC$$

Generally gloss grade paints, either exterior or interior have an RPVC of less than about 1.

CPVC is related inversely to the amount of binder that the pigment particles "absorb." One technique to measure the absorption potential of a pigment or extender is to determine the amount of linseed oil needed to form a paste with a given weight of pigment. This may be referred to as oil absorption. As used herein the term "oil absorption" refers to the procedure described in ASTM D 281. Generally speaking, substitution of an equal amount of high oil absorption extender pigment for one of low oil absorption results in a reduction of the CPVC of that paint. This is turn restricts the range of PVC that can be utilized in exterior formulations as well as the amount of extender pigment, which can be employed.

Paints with PVC below critical, such as semi- and high-gloss paints, have no entrapped air in the dry film. The entire solid surface is wetted by the binder and opacity is obtained solely by pigment and pigment extender particles. At any given particle concentration, opacity is improved or optimized by ensuring maximum surface exposure of the pigment and pigment extender particles to light. Using the ultrafine hydrous kaolin of the present invention as a pigment extender with a particle size similar to the pigment facilitates desirable spacing of the pigment particles, prevents agglomeration of the pigment particles, and ensures maximum exposure to light.

Above the CPVC, paints are considered matte. The degree of matteness is determined by 85 deg gloss, or what is commonly known as the sheen. Below the CPVC, paints are glossy and are considered as either semi-gloss or high gloss. Gloss is typically measured at 60 deg or 20 deg angles.

The structure (PSD, surface area) the ultrafine hydrous kaolin of the present invention facilitates gloss retention and efficient pigment spacing. In one embodiment, the ultrafine hydrous kaolin of the present invention has a similar size to titania and fits in desirably between the dispersed titania particles/agglomerates. In other words, the ultrafine hydrous kaolin extender works generally as a pigment extender, and specifically as a $TiO_2$ pigment spacer, which maximizes exposure of the pigment surface such as $TiO_2$ to light, resulting in higher opacity.

High gloss and semi gloss grade paints contain a mixture of prime pigment and extender pigment with titanium dioxide often used as the prime pigment because of its outstanding optical properties. The most commonly used extender pigments for latex and alkyd paints are hydrous kaolin and finer grades of calcium carbonate and talc. The binder in emulsion paints consists of globules (typically from about 0.1 to about 1.0 micron diameter) of a film-forming polymer having a molecular weight from about 10,000 to about 1,000,000. The latex particle size and composition are varied to effect changes in such properties as durability, gloss, glass transition temperature and the like. At present, acrylic and vinyl-acrylic resins account for the majority of binders used in latex paints.

Conventionally, it is believed in the paint industry that increasing the surface area of ultrafine kaolin pigment adversely affects the gloss performance of the paint at low PVC and below CPVC. However, the inventors unexpected discovered that a high surface area ultrafine hydrous kaolin pigment can provide gloss performance equal to or better than any other hydrous kaolin pigment available commercially.

The reasoning behind this discovery is as follows. The glossing kaolin-based products with 90-91 GEB are typically produced in the kaolin industry using a tertiary crude such as from East Georgia and subjecting it a selective flocculation beneficiation process. One glossing kaolin product, Polygloss® 90 available from J. M. Huber Corporation, believed to be produced through such a process, provides the highest gloss among the commercial pigments available in a number of paint and industrial coatings applications. The ultrafine kaolin of the present invention has a finer PSD and a higher surface area than Polygloss® 90 and unexpectedly resulted in higher gloss without compromising the hiding power of the paint film.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

Table 1 shows the typical characteristics of a gray crude that facilitates successful execution of the present invention. Also listed are characteristics of a specific gray kaolin crude (Example 1) that is used to illustrate the present invention in Examples 2 and 3.

TABLE 1

| Property | Typical values | Example 1 |
| --- | --- | --- |
| GE Brightness | 80-85 | 82.6 |
| Surface area min | 18 ($m^2$/g) | 20 ($m^2$/g) |
| % $TiO_2$ | 1.6-2 | 1.81 |
| % $Fe_2O_3$ | 0.7-1.1 | 0.9 |
| Particle size, % mass finer than | | |
| 2 μm | 80 | 82 |
| 0.3 μm | 35 | 38 |

EXAMPLE 2

The crude from Example 1 is subjected to degritting, ultra-flotation, ozonation, and high-speed centrifuge separation to result in a fine stream and a coarse stream. Flotation is conducted so as to reduce the $TiO_2$ content to less than 0.7%. The centrifuge is operated under conditions to target 18-22% less than 0.3 μm particle size which typically results in 74-78% less than 2 μm particle size. The coarse stream is further subjected to a second centrifuge act so as to recover 90% less than 2 μm particles. The characteristics of the coarse stream subjected to a second centrifuge act and the fine stream from the first centrifuge act are shown in Table 2.

TABLE 2

| Property | Fines following centrifuge |
| --- | --- |
| GE Brightness | 91.2 |
| Surface area ($m^2$/g) | 26.2 |
| % $TiO_2$ | 0.29 |
| % $Fe_2O_3$ | 0.89 |
| Particle size, % mass finer than | |
| 2 μm | 100 |
| 0.3 μm | 71 |

EXAMPLE 3

The ultrafines in Table 2 are flocced using sulfuric acid, bleached, and filtered. The filter cake is dispersed with a specified blend of soda ash/polyacrylate/phosphate, and spray dried. The spray dried product is pulverized to a Hegman grind of 6.5. The characteristics of the ultrafine product (UF I) of the present invention along with a comparison of a commercial Polygloss® 90 kaolin pigment are provided below in Table 3. Also, included is the product ASP® Superfine hydrous aluminosilicate produced using a selective flocculation process by Engelhard Corporation.

TABLE 3

| Properties | Polygloss ® 90 | UF 1 | ASP ® Superfine |
|---|---|---|---|
| Surface Area (m$^2$/g) | 22 | 26 | 22.5 |
| TAPPI Brightness, % | 90.0 | 91.7 | 91.3 |
| Particle Size Distribution Mass % finer than | | | |
| 2 μm | 97 | 99 | 99 |
| 1 μm | 96 | 98 | 96 |
| 0.5 μm | 86 | 92 | 88 |
| 0.3 μm | 60 | 72 | 66 |

EXAMPLE 4

Example 4 demonstrates a solvent neutral base clear alkyd paint formulation. UF I prepared in accordance with Example 3 is tested in a gloss paint application. Paint formulations of Examples 4 to 9 are based on 100 gallons volume and an amount of raw materials in pound per 100 gallons. In the solvent paint there is no adverse impact on gloss in spite of the finer particle size and surface area of the UF I compared to Polygloss® 90.

Solvent Neutral Clear Base Alkyd Paint Formulation

| Raw Material | Amount | Gallon |
|---|---|---|
| VT Alkyd 6693 | 153.8 | 20.6 |
| Mineral Spirits | 36.4 | 5.6 |
| Tixogel | 8.0 | 0.1 |
| Ethanol | 3.0 | 0.5 |
| Mix until smooth | | |
| Lecithin 5 | 2.0 | 0.2 |
| Lo-529 | 2.0 | 0.2 |
| Anti-Float Powder | 6.0 | 0.5 |
| Kaolin | 40.0 | 1.9 |
| BYK 370 | 1.0 | 0.1 |
| Grind to 7 Hegman, then add | | |
| VT Alkyd 6693 | 380.0 | 51.0 |
| VM&P | 62.0 | 9.9 |
| Cobalt 12% | 1.0 | 0.1 |
| Zirco 24% | 3.0 | 0.3 |
| Exkin #2 | 1.0 | 0.1 |
| Hold for Viscosity | | |
| VM&P | 56.0 | 8.9 |
| Total | 755.2 | 100.0 |

Comparative Gloss and Sheen Data of UF I and Polygloss® 90

| Properties | Polygloss ® 90 | UF I |
|---|---|---|
| 20 degree Gloss: | 73.3 | 73.5 |
| 60 degree Gloss: | 91.7 | 91.7 |
| 85 degree Sheen: | 96.1 | 96.5 |

EXAMPLE 5

Example 5 demonstrates an Interior semigloss latex paint formulation. UF I prepared in accordance with Example 3 is tested in another gloss paint application. In the latex paint there is significant improvement in gloss with UF I compared to that due to Polygloss® 90.

Interior Semigloss Latex Paint Formulation

| PVC-22, Low VOC | | |
|---|---|---|
| Raw Material | Amount | Gallon |
| Water | 145.0 | 17.4 |
| KTPP | 1.0 | 0.1 |
| Kathon LX | 1.5 | 0.2 |
| Natrosol Plus 330 | 1.0 | 0.1 |
| Tamol 1124 | 5.0 | 0.6 |
| Triton CF 10 | 3.0 | 0.3 |
| AMP 95 | 2.0 | 0.3 |
| Rhodoline 643 | 1.0 | 0.1 |
| Mix it for 2 min., then add | | |
| TiO$_2$-CR 828 | 240.0 | 7.2 |
| Kaolin | 20.0 | 0.9 |
| Attagel 50 | 5.0 | 0.3 |
| Grind 6 to 7, then add | | |
| Water | 113.1 | 13.6 |
| UCAR 300 | 500.0 | 56.2 |
| Strodex PK 90 | 2.0 | 0.2 |
| Ammonia | 2.5 | 0.3 |
| Polyphobe TR 116 | 1.0 | 0.1 |
| Polyphobe TR 117 | 18.0 | 2.0 |
| Rhodoline 643 | 2.0 | 0.3 |
| Total | 1063.1 | 100.0 |

Comparative Evaluation b/t UF I and Polygloss® 90 Semi Gloss Paint PVC-22

| Properties | UF I | Polygloss ® 90 |
|---|---|---|
| Viscosity KU @ 77° F. | 80 | 82 |
| pH: | 8.3 | 8.4 |
| C.Ratio 3 mils: | 98.7 | 98.5 |
| Reflectance: | 92.3 | 93.1 |
| Whiteness: | 88.2 | 88.6 |
| Yellowness: | 1.6 | 1.5 |
| Hunter L: | 97.5 | 97.6 |
| Hunter a: | −0.9 | −1.0 |
| Hunter b: | 1.3 | 1.2 |
| Gloss @ 60 deg: | 65.1 | 55.2 |
| Sheen @ 85 deg: | 91.8 | 88.7 |
| Gloss @ 20 deg: | 23.1 | 14.7 |

EXAMPLE 6

Example 6 demonstrates a water reducible high gloss alkyd enamel paint formulation. UF 1 prepared in accordance with Example 3 is tested in a high gloss paint application. In a water reducible alkyd high gloss enamel paint, there is significant improvement in the 20 degree gloss value compared to Polygloss®90.

Reducible High Gloss Alkyd Enamel Paint Formulation PVC-16

| Raw Material | Amount | Gallon |
|---|---|---|
| Beckosol 10-060 (70%) | 72.0 | 9.0 |
| Mineral Spirits | 9.3 | 1.4 |
| Bentone SD-1 | 1.5 | 0.1 |
| Mix well, then add: | | |
| LDA 100 Polymeric Dispersant | 2.0 | 0.3 |
| Hex-Cem Calcium Octoate 10% | 3.0 | 0.4 |
| TiO$_2$ - R-706 | 110.0 | 3.3 |
| UF I/Polygloss ® 90 | 15.0 | 0.7 |
| Grind to 7, then add | | |

| Raw Material | Amount | Gallon |
|---|---|---|
| Beckosol 10-060 (70%) | 44.5 | 5.6 |
| Mineral Spirits | 18.0 | 2.8 |
| Mix it well, then add | | |
| Beckosol 10-060 (70%) | 130.0 | 16.3 |
| Mineral Spirits | 92.4 | 14.2 |
| Cobalt Octoate 12% | 1.0 | 0.1 |
| Zirconium Octoate 12% | 4.0 | 0.5 |
| Skine # 2 | 1.0 | 0.1 |
| Mix well, then add under agitation: | | |
| LPR 76, Polysach. Resin 44% | 40.0 | 4.0 |
| Water | 344.3 | 41.3 |
| Mix for 30 min.: | | |
| Total | 888.0 | 100.0 |

Comparative Evaluation b/t UF I and Polygloss® 90 in High Gloss Alkyd Enamel Paint Formulation PVC-16

| Properties | UF I | Polygloss ® 90 |
|---|---|---|
| Viscosity KU @ 77° F. | 91 | 92 |
| C.Ratio 3 mils: | 92.3 | 91.9 |
| Reflectance: | 87.2 | 87.0 |
| Whiteness: | 77.7 | 77.3 |
| Yellowness: | 4.2 | 4.3 |
| Hunter L: | 95.9 | 95.9 |
| Hunter a: | −1.2 | −1.2 |
| Hunter b: | 2.7 | 2.8 |
| Gloss @ 60 deg: | 78.8 | 75.1 |
| Sheen @ 85 deg: | 98.3 | 97.6 |
| Gloss @ 20 deg: | 41.5 | 31.4 |

EXAMPLE 7

Example 7 demonstrates a interior/exterior gloss paint formulation. UF 1 prepared in accordance with Example 3 is tested in another high gloss paint application. In a styrene acrylic high gloss waterborne paint, UF 1 exhibited higher 20 and 60 degree gloss values compared to Polygloss® 90.

Interior/Exterior Gloss Paint PVC-18.7

| Raw Material | Amount | Gallon |
|---|---|---|
| Water | 62.6 | 7.5 |
| Kathon LX 1.5% | 1.6 | 0.2 |
| Tamol 1124 | 5.5 | 0.6 |
| Surfynol 104E | 1.0 | 0.1 |
| Igepal CTA-639W | 1.0 | 0.1 |
| BYK-022 | 1.0 | 0.1 |
| Mix for 2 min., then add | | |
| Ti Pure - R 706 | 202.5 | 6.1 |
| Kaolin | 14.5 | 0.7 |
| Grind 6 to 7, then add | | |
| Propylene Glycol | 30.28 | 3.5 |
| Rhoplex HG-700 | 618.1 | 70.0 |
| Water | 21.45 | 2.6 |
| Texanol | 21.5 | 2.7 |
| Triton X 405 | 3.5 | 0.4 |
| Ammonia | 1.0 | 0.1 |
| Pre mix following three, then add | | |
| Water | 22 | 2.6 |
| Acrysol RM 5 | 22 | 2.4 |
| BYK-024 | 2.0 | 0.3 |
| Total | 1031.5 | 100.0 |

Comparative Evaluation b/t UF I and Polygloss® 90 in Interior/Exterior Gloss Paint PVC-18.7

| Properties | UF I | Polygloss ® 90 |
|---|---|---|
| Viscosity KU @ 77° F. | 94 | 95 |
| pH | 8.4 | 8.4 |
| C.Ratio 3 mils: | 98.2 | 98.2 |
| Reflectance: | 94.5 | 94.5 |
| Whiteness: | 91.0 | 91.0 |
| Yellowness: | 1.1 | 1.1 |
| Hunter L: | 98.0 | 98.0 |
| Hunter a: | −0.8 | −0.8 |
| Hunter b: | 0.9 | 0.9 |
| Gloss @ 60 deg: | 78.5 | 77.8 |
| Sheen @ 85 deg: | 93.4 | 93.1 |
| Gloss @ 20 deg: | 52.3 | 51.5 |

EXAMPLE 8

Example 8 demonstrates a gloss white enamel paint formulation. UF 1 prepared in accordance with Example 3 is tested in another high gloss paint application. In another styrene acrylic enamel paint, 10% TiO$_2$ is extended with volume amount of UF 1 by keeping the PVC of the paint same. UF 1 unexpectedly exhibited similar opacity and gloss performance compared to paint having 100% TiO$_2$. UF 1 also showed higher gloss in the paint than Polygloss®90.

Gloss White Enamel Paint PVC-17.6

| | Control 100% TiO$_2$ | | (−) 10% TiO$_2$ by kaolin volume | |
|---|---|---|---|---|
| Raw Material | Amount | Gallon | Amount | Gallon |
| Water | 169.2 | 20.3 | 169.2 | 20.3 |
| Kathon LX 1.5% | 3.0 | 0.4 | 3.0 | 0.4 |
| KTPP | 0.5 | 0.1 | 0.5 | 0.1 |
| Tamol 1124 | 3.5 | 0.4 | 3.5 | 0.4 |
| Propylene Glycol | 26.0 | 3.0 | 26.0 | 3.0 |
| Surfynol 104H | 1.0 | 0.1 | 1.0 | 0.1 |
| BYK-022 | 1.0 | 0.1 | 1.0 | 0.1 |
| Acrysol TT 935 | 8.0 | 0.9 | 8.0 | 0.9 |
| Ammonia | 2.0 | 0.3 | 2.0 | 0.3 |
| Mix it for 2 min., then add | | | | |
| CR 828 | 225.0 | 6.8 | 202.5 | 6.1 |
| Hydrous Kaolin | 0.0 | 0.0 | 14.5 | 0.7 |
| Grind 6 to 7, then add | | | | |
| Stordex PK 90 | 1.0 | 0.1 | 1.0 | 0.1 |
| Ucar 471 | 516.1 | 59.6 | 516.1 | 59.6 |
| Texanol | 20.0 | 2.5 | 20.0 | 2.5 |
| Water | 20.7 | 2.5 | 20.7 | 2.5 |

| Raw Material | Control 100% TiO$_2$ | | (−) 10% TiO$_2$ by kaolin volume | |
|---|---|---|---|---|
| | Amount | Gallon | Amount | Gallon |
| Synthesizer 160 | 10.0 | 1.1 | 10.0 | 1.1 |
| Acrysol RM 5 | 15.0 | 1.7 | 15.0 | 1.7 |
| BYK-024 | 2.0 | 0.3 | 2.0 | 0.3 |
| Total | 1024.0 | 100.0 | 1016.0 | 100.0 |

Comparative Evaluation b/t UF I and Polygloss® 90 in Gloss White Enamel Paint PVC-17.6

| Properties | 100% TiO$_2$ Control | (−) 10% TiO$_2$ UF I | (−) 10% TiO$_2$ Polygloss® 90 |
|---|---|---|---|
| Viscosity KU @ 77° F. | 96 | 97 | 95 |
| pH | 8.6 | 8.5 | 8.5 |
| C. Ratio 3 mils: | 98.0 | 97.8 | 97.8 |
| Reflectance: | 94.4 | 93.8 | 93.7 |
| Whiteness: | 91.1 | 90.1 | 90.1 |
| Yellowness: | 0.5 | 0.7 | 0.7 |
| Hunter L: | 97.9 | 97.8 | 97.8 |
| Hunter a: | −0.9 | −0.9 | −0.9 |
| Hunter b: | 0.8 | 1.0 | 1.0 |
| Gloss @ 60 deg: | 75.1 | 75.3 | 74.6 |
| Sheen @ 85 deg: | 93.4 | 93.4 | 92.6 |
| Gloss @ 20 deg: | 39.2 | 38.1 | 37.2 |

EXAMPLE 9

Example 9 demonstrates a two part waterborne epoxy coating formulation. UF 1 prepared in accordance with Example 3 is tested in another high gloss paint application. In the high gloss waterborne epoxy paint formulation, there is improvement in 20 degree gloss value with UF 1, when compared with Polygloss® 90.

Two Part Waterborne Epoxy Coating PVC-22.7, Usable Pot Life—6 hrs

| Raw Material | Pounds | Gallons |
|---|---|---|
| Part - A | | |
| EPI-REZ Resin 3520-WY-55 | 329.4 | 36.0 |
| Water | 116.3 | 14.0 |
| Total Part A | 445.7 | 50.0 |
| Part - B | | |
| EPI-CURE Curing Agent 8536-MY-60 | 160 | 19.3 |
| Agitan 731 | 2.0 | 0.2 |
| TiO$_2$ - R 900 | 250 | 7.5 |
| Kaolin - Polygloss® 90/UF I | 30 | 1.4 |
| Grind at High speed to 6 to 7, then add | | |
| EPI-CURE Curing Agent 8536-MY-60 | 22.5 | 2.7 |
| Glacial Acetic Acid | 2.3 | 0.3 |
| Water | 155.4 | 18.7 |
| Total Part B | 622.2 | 50.0 |

| Raw Material | Pounds | Gallons |
|---|---|---|
| Composite Blend | | |
| Part - A | 445.7 | 50.0 |
| Part - B | 621.9 | 50.0 |
| Total Part A and B | 1067.6 | 100.0 |

Comparative Evaluation b/t UF I and Polygloss® 90 in Two Part Waterborne Epoxy Coating PVC-22.7

| Properties | UF I | Polygloss® 90 |
|---|---|---|
| Viscosity KU @ 77° F. | 118 | 119 |
| C.Ratio 3 mils: | 97.2 | 97.0 |
| Reflectance: | 90.3 | 90.2 |
| Whiteness: | 81.5 | 81.7 |
| Yellowness: | 3.9 | 4.1 |
| Hunter L: | 97.1 | 97.1 |
| Hunter a: | −1.2 | −1.2 |
| Hunter b: | 2.5 | 2.7 |
| Gloss @ 60 deg: | 100 | 100 |
| Sheen @ 85 deg: | 97.3 | 97.0 |
| Gloss @ 20 deg: | 98.8 | 97.7 |

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of processing kaolin, comprising sequentially:
subjecting a kaolin crude comprising at least 75 wt. % of gray kaolin to flotation to provide a kaolin having reduced titania content;
centrifuging the kaolin having reduced titania content at high speeds to provide a coarse stream and a fine stream, the coarse stream comprising kaolin wherein at least about 70% by weight has a size of 2 microns or less, the fine stream comprising kaolin wherein at least about 80% by weight has a size of 1 micron or less; and
refining the fine stream into an ultrafine hydrous kaolin pigment;
said refining comprising flocculation, bleaching, filtering, spray drying, and pulverizing after spray drying,
said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m$^2$/g, and brightness of the particles is at least about 91; a moisture level less than about 1% by weight, from 0.29 to about 0.75% by weight of titania, and from 0.89 to about 1.5% by weight of iron oxide,
said ultrafine hydrous kaolin pigment comprising no charged inorganic or organic molecules from selective flocculation, and
wherein the method does not comprise selective flocculation.

2. The method of claim 1, wherein centrifuging at high speeds involves using "g" forces from about 1,000 to about 10,000.

3. The method of claim 1, wherein flotation reduces the titania content of the kaolin to less than about 1% by weight.

4. The method of claim 1, wherein flotation comprises one of froth flotation, ultraflotation, and TREP flotation.

5. The method of claim 1, further comprising degritting the kaolin crude before subjecting the kaolin crude to flotation.

6. The method of claim 1 further comprising ozonating the kaolin having a reduced titania content before centrifuging the kaolin, ozonating comprising contacting the kaolin having a reduced titania content with about 0.1 to about 20 pounds of ozone per ton of kaolin.

7. The method of claim 1, wherein refining the fine stream comprises at least two of flocculation, bleaching, filtering, and drying.

8. The method of claim 1, wherein refining the fine stream comprises at least three of flocculation, bleaching, filtering, spray drying, and pulverization.

9. The method of claim 1 further comprising refining the coarse stream into a coarse engineered kaolin pigment.

10. The method of claim 1, further comprising testing and generating data of at least one parameter of at least one of the kaolin crude, the kaolin having reduced titania content, the fine stream, or ultrafine kaolin pigment or at least one parameter of subjecting the kaolin crude to flotation and centrifuging the kaolin at high speeds; and controlling operation of at least one of subjecting the kaolin crude to flotation and centrifuging the kaolin at high speeds based on data generated by the tester.

11. A paint composition, comprising:
a major amount of a paint vehicle; and
a minor amount of ultrafine hydrous kaolin pigment prepared by a process comprising:
   subjecting a kaolin crude comprising at least 75 wt. % of gray kaolin to flotation to provide a kaolin having reduced titania content;
   centrifuging the kaolin having reduced titania content at high speeds to provide a coarse stream and a fine stream, the coarse stream comprising kaolin wherein at least about 70% by weight has a size of 2 microns or less, the fine stream comprising kaolin wherein at least about 80% by weight has a size of 1 micron or less, and
   refining the fine stream into an ultrafine hydrous kaolin pigment;
      said refining comprising flocculation, bleaching, filtering, spray drying, and pulverizing after said spray drying,
      said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m$^2$/g, and brightness of the particles is at least about 91; a moisture level less than about 1% by weight, from 0.29 to about 0.75% by weight of titania, and from 0.89 to about 1.5% by weight of iron oxide,
      said ultrafine hydrous kaolin pigment comprising no charged inorganic or organic molecules from selective flocculation,
   said paint composition having a high gloss finish and a gloss at 20 degrees from 14.7 to 73.5, and
   wherein the process of preparing the ultrafine hydrous kaolin pigment does not comprise selective flocculation.

12. The paint composition of claim 11, wherein the paint vehicle comprises at least one of a latex paint vehicle, an oil based paint vehicle, an alkyd paint vehicle, an acrylic paint vehicle, a styrene paint vehicle, and an epoxy paint vehicle.

13. The paint composition of claim 11, wherein the paint vehicle comprises an alkyd paint vehicle for providing a high gloss finish.

14. The paint composition of claim 11 comprising from 50% to about 99.99% (percent volume of dry paint film) of the paint vehicle and from about 0.01% to about 49% (percent volume of dry paint film) of the ultrafine hydrous kaolin pigment.

15. The paint composition of claim 11 comprising from 50% to about 99.9% (percent volume of dry paint film) of the paint vehicle, from about 0.1% to about 40% (percent volume of dry paint film) of titania, and from about 0.1% to about 40% (percent volume of dry paint film) of the ultrafine hydrous kaolin pigment.

16. The paint composition of claim 11, wherein at least about 98% by weight of the kaolin particles have a size of 2 microns or less, at least about 97% by weight of the kaolin particles have a size of 1 micron or less, at least about 90% by weight of the kaolin particles have a size of 0.5 microns or less, at least about 70% of the kaolin particles have a size of 0.3 microns or less, and the surface area of the kaolin particles is at least about 25 m$^2$/g; a moisture level less than about 0.5% by weight, from 0.29 to about 0.5% by weight of titania, and from 0.89 to about 1.25% by weight of iron oxide.

17. The paint composition of claim 11, wherein the brightness of the kaolin particles is greater than 92.

18. The paint composition of claim 11, wherein the paint composition has a pigment volume concentration (PVC) less than the critical pigment volume composition (CPVC) of the paint composition.

19. The paint composition of claim 11, wherein the paint composition has a higher gloss at 20 degrees than an identical paint composition comprising an ultrafine kaolin made by a process including selective flocculation.

20. The paint composition of claim 11, wherein said ultrafine hydrous kaolin pigment comprises from 0.29% to less than 0.4% by weight of titania.

21. A paint composition, comprising:
a major amount of a paint vehicle; and
a minor amount of ultrafine hydrous kaolin pigment:
   said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m$^2$/g, and brightness of the particles is at least about 91; a moisture level less than about 1% by weight, from 0.29 to about 0.75% by weight of titania, and from 0.89 to about 1.5% by weight of iron oxide,
   said paint composition having a high gloss finish and a gloss at 20 degrees from 14.7 to 73.5.

22. A paint composition, comprising:
a major amount of a paint vehicle; and
a minor amount of ultrafine hydrous kaolin pigment:
   said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m²/g, and brightness of the particles is at least about 91; a moisture level less than about 1% by weight, from 0.29 to about 0.75% by weight of titania, and from 0.89 to about 1.5% by weight of iron oxide, said ultrafine hydrous kaolin pigment comprising no charged inorganic or organic molecules from selective flocculation, and said paint composition having a high gloss finish and a gloss at 20 degrees from 14.7 to 73.5.

23. A paint composition, comprising:

a major amount of a paint vehicle; and a minor amount of ultrafine hydrous kaolin pigment prepared by a process comprising:

subjecting a kaolin crude comprising at least 75 wt. % of gray kaolin to flotation to provide a kaolin having reduced titania content;

centrifuging the kaolin having reduced titania content at high speeds to provide a coarse stream and a fine stream, the coarse stream comprising kaolin wherein at least about 70% by weight has a size of 2 microns or less, the fine stream comprising kaolin wherein at least about 80% by weight has a size of 1 micron or less, and refining the fine stream into an ultrafine hydrous kaolin pigment;

said refining comprising flocculation, bleaching, filtering, spray drying, and pulverizing after said spray drying, said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m²/g, and brightness of the particles is at least about 91; a moisture level less than about 1% by weight, from 0.29 to about 0.75% by weight of titania, and from 0.89 to about 1.5% by weight of iron oxide, said paint composition having a high gloss finish and a gloss at 20 degrees from 14.7 to 73.5, and wherein the process of preparing the ultrafine hydrous kaolin pigment does not comprise selective flocculation.

24. A paint composition, comprising:

a major amount of a paint vehicle; and a minor amount of ultrafine hydrous kaolin pigment:

said ultrafine hydrous kaolin pigment comprising particles wherein at least about 97% by weight of the particles have a size of 2 microns or less, at least about 96% by weight of the particles have a size of 1 micron or less, at least about 89% by weight of the particles have a size of 0.5 microns or less, at least about 67% of the particles have a size of 0.3 microns or less, a surface area of the particles is more than 23 m²/g, and brightness of the particles is at least about 91; a moisture level less than about 1% by weight, from 0.29 to about 0.75% by weight of titania, and from 0.89 to about 1.5% by weight of iron oxide.

* * * * *